US005530945A

United States Patent [19]
Chavez, Jr. et al.

[11] Patent Number: 5,530,945
[45] Date of Patent: Jun. 25, 1996

[54] INFRASTRUCTURE EQUIPMENT IN A WIRELESS COMMUNICATION SYSTEM SERVES DIFFERENT SERVICE PROVIDERS

[75] Inventors: David L. Chavez, Jr., Thornton; Donald D. Gallagher, Boulder, both of Colo.; Lawrence D. Henderson, Naperville, Ill.

[73] Assignee: AT&T Corp., Murray Hill, N.J.

[21] Appl. No.: 114,566

[22] Filed: Aug. 31, 1993

[51] Int. Cl.[6] .............................. H04Q 7/04; H04M 1/72; H04B 7/26
[52] U.S. Cl. .............................. 379/62; 379/63; 379/59
[58] Field of Search .............................. 379/58, 59, 60, 379/61, 63, 62; 455/33.1, 54.1, 56.1

[56] References Cited

U.S. PATENT DOCUMENTS

| | | | |
|---|---|---|---|
| 4,166,931 | 9/1979 | MacPherson et al. | 379/399 |
| 4,991,198 | 2/1991 | Tate et al. | 379/62 |
| 5,208,847 | 5/1993 | Allen | 379/59 |
| 5,251,249 | 10/1993 | Allen et al. | 379/59 |
| 5,289,525 | 2/1994 | Issenmann et al. | 379/58 |
| 5,309,501 | 5/1994 | Kozik et al. | 379/59 |
| 5,333,178 | 7/1994 | Norell | 379/58 |
| 5,337,344 | 8/1994 | Alvesalo | 379/59 |
| 5,367,558 | 11/1994 | Gillig et al. | 379/58 |

FOREIGN PATENT DOCUMENTS

| | | |
|---|---|---|
| 0338034A2 | 9/1990 | European Pat. Off. . |
| 0510630A2 | 10/1992 | European Pat. Off. . |
| 930385A1 | 7/1992 | WIPO . |

Primary Examiner—Scott A. Rogers
Assistant Examiner—Fan Lee
Attorney, Agent, or Firm—Charles L. Warren

[57] ABSTRACT

Independent groups of wireless telephone subscribers (tenants) are supported by common infrastructure communication equipment including network controller (WNC) and a database that stores group membership A plurality of radio frequency base stations are disposed to provide wireless communications channels for the wireless telephones. A switched telecommunication office supports conventional wired communication channels. The WNC supports a plurality of base stations and can couple a wireless and wired communication channel together to provide a voice channel for a wireless telephone subscriber. The WNC only provides a voice channel to a requesting wireless telephone subscriber if the base station carrying the request has been assigned to handle the group that includes the the requesting subscriber as determined by the database.

15 Claims, 3 Drawing Sheets

INFRASTRUCTURE EQUIPMENT IN A WIRELESS COMMUNICATION SYSTEM SERVES DIFFERENT SERVICE PROVIDERS

CROSS-REFERENCE TO RELATED APPLICATION

This application is related to the application titled "Telephone Call Transfer Between a Wireless and Wired Telephone" having inventors John Peter Jensen and Michael Ray Ross.

BACKGROUND OF THE INVENTION

The present invention is directed to a wireless communication system in which multiple service providers provide wireless communication facilities for respective groups of subscribers. A "service provider" as used herein means a person or entity that controls whether a wireless communication user is authorized as a member of an associated group of subscribers that receive service, e.g. voice or data communications, over a communication system at least partially administered by the service provider. The invention is especially, but not exclusively, adapted a support wireless communications for independent groups of subscribers (tenants) located in a limited geographic region. For example, independent groups of wireless telephone subscribers could consist of employees of different companies located at a common site, such as in a shopping mall or business complex.

Various wireless communication systems are available. Shared access two-way communications are available that cover relatively wide geographic areas for users such as public utilities, police and fire departments. A single radio frequency (RF) base station is located with its antenna at an advantageous geographic elevation in order to provide a substantial area of coverage consisting of many males.

Cellular communication networks are also utilized to provide a variety of users with wireless telephone communications typically in a metropolitan area. The total coverage area is divided into a plurality of smaller cells which provide communications with the user while the user is located within a given cell. As the user travels from a first cell to a second cell, a hand-off is made, that is, the cell site equipment providing communications to the user changes from the first cell from which the user left to the second cell just entered by the user.

In large U.S. metropolitan areas, different providers of cellular communication services compete for subscribers. Each such provider maintains its own separate communication infrastructure including RF base stations and related switching equipment. While these communication networks are generally effective, such stand-alone communication systems are relatively expensive in that they require duplication of infrastructure support equipment.

SUMMARY OF THE INVENTION

It is an object of the present invention to minimize the duplicity of infrastructure equipment associated with wireless telephone systems by enabling subscribers (tenants) of different service providers to be served by common switching equipment.

In accordance with an embodiment of the present invention, a communication system includes wireless telephones, radio frequency base stations that provide wireless communication channels for the wireless telephones, and a switched telecommunication office that supports wired communication channels. A wireless network controller (WNC) interconnects the wired and wireless communication channels and receives requests from wireless telephones via the base stations for access to a communication channel. A database coupled to the WNC associates each wireless telephone to only one of a plurality of independent tenant groups. The database also determines, in response to an access message (inquiry) from the WNC, whether a wireless telephone making an access request for a communication channel is a member of the group of tenants supported by the base station that received the request. The WNC, upon receiving a reply from the database that the wireless telephone making the request is a member of the group of tenants supported by the base station that received the request, interconnects a wired communication channel from the telecommunications office with a wireless communication channel provided by the base station associated with the requesting wireless telephone. Thus the WNC is capable of serving a plurality of wireless telephone service providers and their respective tenant groups.

DETAILED DESCRIPTION

Figure 1:
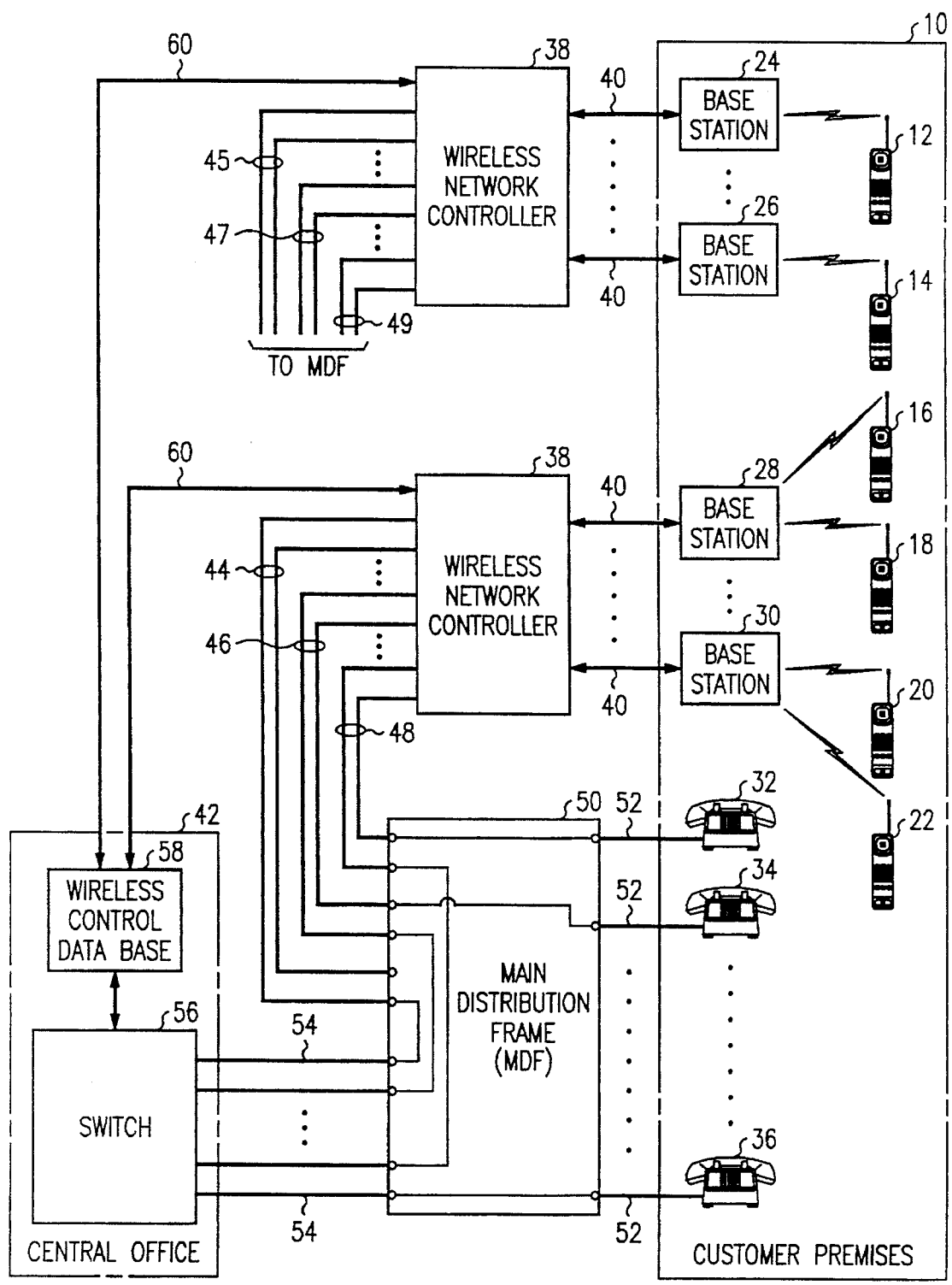
FIG. 1 is a block diagram of a telecommunication system which incorporates an embodiment of the present invention.

FIG. 1 illustrates a telecommunications system in accordance with the present invention wherein users having wireless telephones 12–22 are provided wireless communications within customer premises location 10 such as a university campus, shopping mall or business complex. A plurality of wireless base stations 24–30 provide wireless communication channels for the wireless telephones. In the illustrative example, base stations 24 and 28 support a first group of subscribers via wireless telephones 12, 16 and 18; base stations 26 and 30 support a second group of subscribers via wireless telephones 14, 20 and 22. Each base station is capable of concurrently supporting a plurality of wireless communication channels.

The wireless telephone users comprise groups of tenants in which users of like characteristics are normally members of the same tenant group. For example, groups of employees of different companies who work at locations within customer premises 10 may comprise respective groups of tenants with each company being a service provider. A predetermined set of base stations is assigned to support each tenant group. Preferably, a base station cannot be accessed by a user who is a member of a tenant group not assigned to that base station.

Also located at the customer premises 10 are a plurality of conventional wired telephones 32, 34, and 36. Generally, wired telephones on the customer premises; are available to all who desire conventional telephone service. In this example, the telephones 32 and 34 are associated with users who also have wireless telephones 16 and 20, respectively; telephone 36 is associated with a user who is not a wireless telephone subscriber. It will be apparent that users may subscribe for only a conventional wire line telephone, for only a wireless telephone, or may subscribe to have both a wired and a wireless telephone.

Each base station is connected to a wireless network controller (WNC) 38 by a wire communication channel 40 which supports voice and control communication channels, which may consist of multiplexed channels, so that a plurality of users can be concurrently supported. The wireless network controllers 38 provide operational commands to the connected base stations and receive status reports from the base stations over the control communication channel carried by communication channel 40. The wireless network controllers 38 provide a voice channel link between the associated base stations that support the wireless telephones and central office 42. In the preferred embodiment, a plurality of pairs of wire telephone lines as represented by telephone line pairs 44–49, connect the wireless network controllers 38 to a main distribution frame 50. A pair of telephone lines from the WNC is provided for each wireless telephone voice channel supported by the WNC. In the illustrative example, one of the pairs of telephone lines may be connected by the main distribution frame 50 via wire communication line 52 to a conventional wired telephone. The other of the pair of telephone lines connecting wireless network controller 38 to main distribution frame 50, is connected by lines 54 to telecommunication switch 56 of central office 42. Although a switch 56 is shown in a central office 42 in the illustrative embodiment, an intelligent switching device such as a PBX could also be used with the present invention. Connecting conventional telephones through the main distribution frame 50 to wireless network controller 38 permits the WNC to couple a central office switch line 54 to either the wired telephone or a wireless telephone; operation of the WNC is explained below. A wireless control database 58 of the central office 42 is coupled by communication channel 60 to the WNC's 38 and provides a source of information to the WNC's relating to both wired and wireless users in the illustrated system. The database 58 can also be coupled to switch 56 and provide an information source for the switch as well. However, the information stored in the database relating to the wireless telephones could also be stored in a separate database such as located outside of the central office or contained as part of the WNC.

Figure 2:
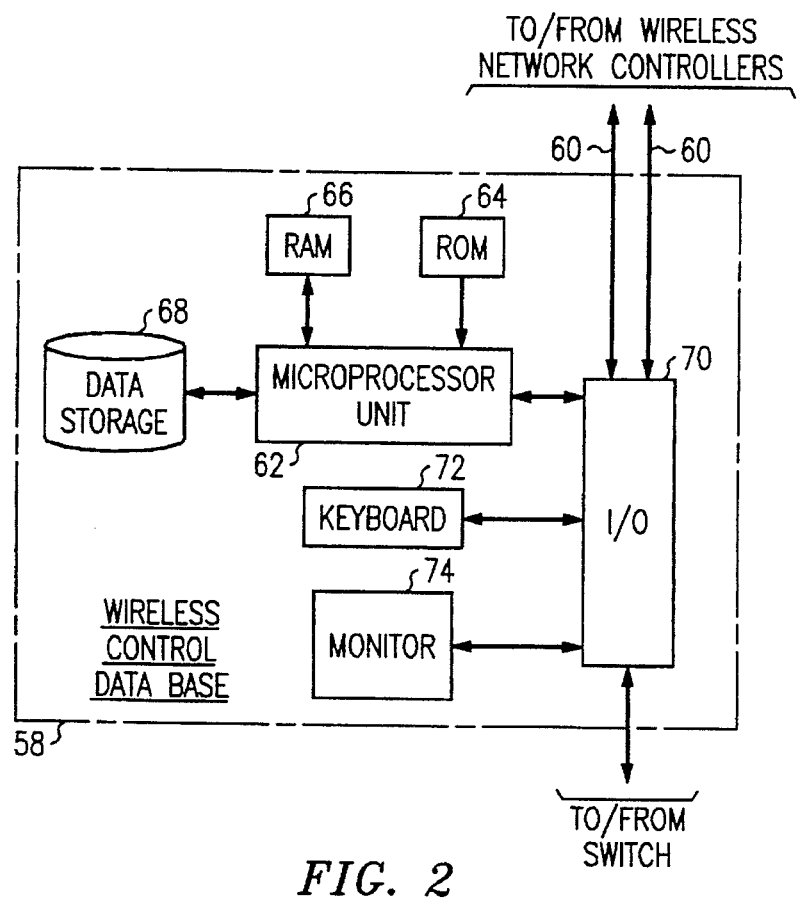
FIG. 2 is a block diagram of a wireless control database as shown in FIG. 1.

FIG. 2 illustrates an embodiment of the wireless control database 58 which includes a microprocessor unit 62 which operates in conjunction with read only memory (ROM) 64, random access memory (RAM) 66, and a data storage facility 68 which may comprise a disk drive or other storage media. A conventional input/output (I/O) peripheral 70 is coupled to microprocessor unit 62 and provides input/output to the switch 56 and the wireless network controllers by channels 60. A conventional keyboard 72 and monitor 74 are coupled to the microprocessor unit 62 via I/O peripheral 70, and provides access to a local administrator of the wireless control database 58. Normally the data relevant to an inquiry is loaded into RAM 66 from data storage device 68, and then searched or otherwise processed by microprocessor unit 62 using known software methods.

Figure 3:
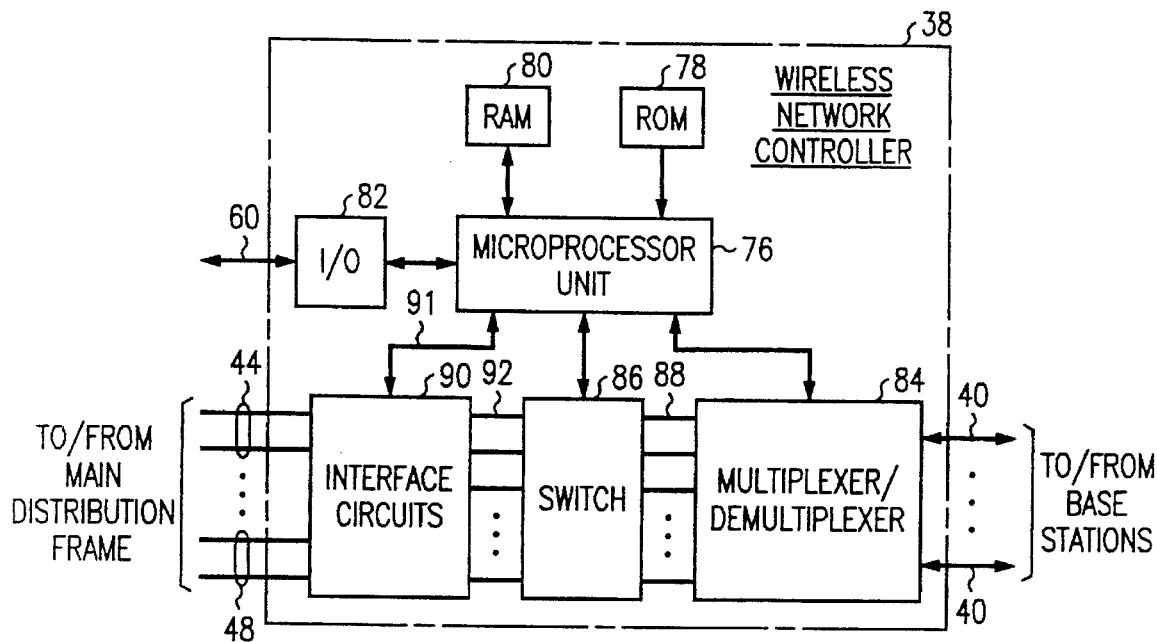
FIG. 3 is a block diagram of a wireless network controller as shown in FIG. 1.

Referring to FIG. 3, the wireless network controller 38 includes a microprocessor unit 76 which operates under the control of a program stored in ROM 78 and utilizes RAM 80 for data storage. An input/output peripheral 82 provides an interface between microprocessor 76 and the channel 60 which couples the controller to wireless control database 58. A multiplexer/demultiplexer 84 operating under the control of microprocessor 76 serves to multiplex and demultiplex the control and communication channels carried on lines 40, which are coupled to the supported base stations. In the illustrated example, lines 40 carry multiplexed communications capable of supporting a plurality of voice and control channels to each base station. Communication lines 88 each carry a single service communication channel which may carry subscriber voice or data from the multiplexer/demultiplexer 84 to switch 86. A conventional matrix connection of lines 88 and line 92 is made by switch 86 which is controlled by microprocessor unit 76. Interface circuits 90 couple the pairs of telephone lines 44–49 to the switch 86 via lines 92. Each pair consists of one 2-wire line coupled to a line 54 of telecommunication switch 56 and another 2-wire line which can be coupled to a line 52 of a wired telephone. For each of the pairs of telephone lines, a separate interface circuit selectably couples a telephone line 54 from telecommunication switch 56 to a conventional wire telephone or to a wireless telephone via a line 92, switch 86, a line 88, multiplexer/demultiplexer 84, a line 40, and the base station that provides; the wireless communication channels to the desired wireless telephone.

Figure 4:
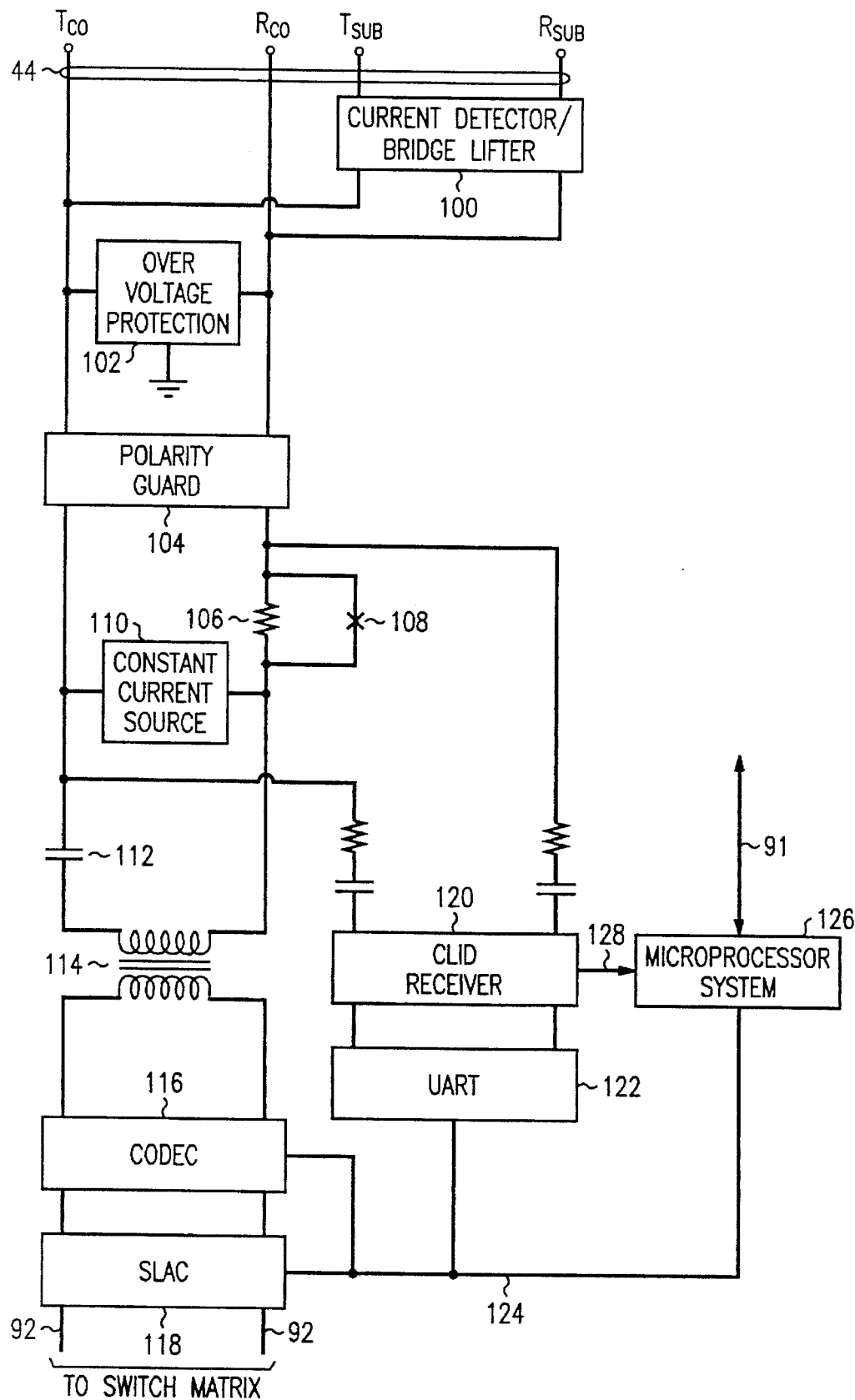
FIG. 4 is a block diagram of an interface circuit as shown in FIG. 3.

FIG. 4 illustrates one of a plurality of like interface circuits which are coupled to each pair of telephone lines connected to the WNC; these circuits collectively comprise interface circuits 90. The illustrated circuit controls whether the tip and ring lines $T_{co}$, $R_{co}$, which are connected by MDF 50 and line 54 to telecommunication switch 56, are coupled to a wireless telephone by line 92 or a conventional wired telephone by tip and ring lines $T_{SUB}$, $R_{SUB}$. Each interface circuit is connected by a bus 91 to microprocessor 76 (see FIG. 3).

A current detector and bridge lifter circuit 100, such as an AT&T miniature bridge lifter model 410A, is coupled to the $T_{SUB}$ and $R_{SUB}$ lines. The current detector portion of circuit 100 monitors the status of the wired telephone, i.e. on-hook or off-hook, by detecting current flow. The bridge lifter circuit 100 uses the on/off-hook status to control the AC impedance looking toward Tsub/Rsub from Tco/Rco. While an on-hook status is sensed, the impedance is high to simulate a conventional on-hook wired telephone; while an off-hook status is sensed, the impedance is low to simulate a conventional off hook wired telephone. Thus the bridge lifter allows transmission losses to be controlled. Subscriber loops have characteristics which the interface circuits must match to prevent effects such as echo and signal loss. The circuit 100 also provides a signal to microprocessor 126 indicating of the on/off-hook status which may cause adjustment of the impedance presented to Tco/Rco from the wireless telephone circuitry. The bridge lifter 100 and SLAG 118 cooperate to control the impedance seen by Tco/Rco to prevent the end users from noticing a difference in signal level regardless of the state of the coupled wired and wireless telephones. Further information concerning the bridge lifter can be obtained by referring to U.S. Pat. No. 4,166,931.

A conventional overvoltage protection circuit 102 is connected across the $T_{co}$ and $R_{co}$ lines to provide protection against hazardous high voltages. A polarity guard circuit 104 such as comprising diodes protects the remainder of the illustrated interface circuit should a reverse polarity condition occur such as a reverse connection between tip and ring at the central office. Resistor 106 and relay contact 108 combine to provide ringing signal load and the ring trip function. The relay (not shown) associated with contact 108 is controlled by microprocessor 126. When ringing is provided from the central office via Tco/Rco lines, resistor 106 causes the wireless circuitry to look like an on-hook telephone. Relay contact 108 is open and constant current source 110 is not drawing current to simulate an off-hook condition to Tco/Rco except when the wireless telephone is off-hook. The CLID receiver 120 which includes a ring detector will sense the ringing, provide a signal indicating same to the microprocessor 126 which will cause the wireless telephone to be notified it should ring. If the wireless telephone goes off-hook during ringing, a control signal from the microprocessor to the relay will close relay contact 108 and cause the constant current source 110 to draw current, thereby ring tripping the ringing signal.

A constant current source 110 is utilized to signal the central office switch of a demand for service by establishing a DC current flow on lines $T_{co}$ and $R_{co}$ when a communication path is to be established to a wireless telephone. The current source 110 is controlled by the microprocessor 126 in response to the current detector portion of circuit 100. When the wired telephone is on-hook, the current source will sink sufficient current via Tco/Rco to signal an off-hook of the wireless telephone. If the wired telephone goes off-hook, the current source will not sink DC current. This allows the correct amount of current to be supplied to (sunk by) the wired telephone, ensuring the AC gain of the microphone of the wired telephone is correctly set. This allows both the wired and wireless telephones to be off-hook and still provide the Tco/Rco line with the expected conventional impedance.

Capacitor 112 isolates the audio coupling transformer 114 from DC current and permits the constant current source 110 to control the DC current flow independent of the presence of transformer 114. A codec 116 provides a traditional coding and decoding capability wherein analog voice coupled by transformer 114 is coded into a digital format. Similarly, the codec 116 receives digital voice information via lines 92 and converts (decodes) it to analog voice which is coupled to transformer 114. An Advanced Micro Devices AM79C02 can be used to provide both the codec and subscriber line audio processing (SLAC) functions. The SLAC 118 adjusts the impedance on the CODEC side of the transformer 114 so that transmission characteristics are correct. These impedances will change depending on the status of the wireless and wired telephones. The microprocessor 126 controls the impedance presented by the SLAC in response to the current detector of circuit 100 and wireless telephone status.

A calling line identification (CLID) receiver 120, which may comprise a Motorola MC145447, is coupled across the central office side of transformer 114 via a series resistor-capacitor combination that provides isolation and detects calling line identification signals (FSK signals) transmitted from the central office switch. The calling line identification is transferred in digital form to a universal asynchronous receiver/transmitter (UART) 122, which transmits it to a communication bus 124. A microprocessor system 126, which includes a known arrangement of a microprocessor, ROM, RAM, and required supporting peripherals such as input/output peripherals, is coupled to bus 124 and to communication line 91, which provides communications with microprocessor unit 76 in the WNC. An input on line 128 from the CLID receiver 120 provides an alert to microprocessor system 126 upon the receipt of a calling line identification signal for the system 126 to receive the digitally formatted CLD information via bus 124 from UART 122.

The CLID information is sent on to the wireless telephone where it can be used such as in a visual display, if the telephone is capable of such display.

As an example of an aspect of the illustrated embodiment of the present invention, base stations 24 and 28 support a first group of subscribers (tenants) associated with service provider X, and base stations 26 and 30 support a second group of subscribers associated with service provider Y. Subscribers in the second group are not provided voice communication access via base stations 26 and 30, and likewise subscribers in the first group are not provided voice communications via base stations 26 and 30.

It will be apparent to those skilled in the art that a prospective subscriber must first become a member of one of the supported groups of tenants by registering with the telecommunication system. More specifically, a unique identification number associated with each wireless telephone must be entered in wireless control database 58 along with the directory number associated with the subscriber, the tenant group, and the corresponding port of switch 56, i.e. which of the lines 54, are associated with the corresponding directory number. The database 58 also stores a list of base stations assigned each tenant group to facilitate a determination if a particular base station can be utilized to support a subscriber.

In this example, the subscriber associated with wireless telephone 16 of the second group of tenants is also associated with conventional wire telephone 32. The subscriber causes wireless telephone 16 to initiate a request for service. Assuming the subscriber is within the range of base station 28 (or another base station that supports the second group of tenants) and the request for service from wireless telephone 16 is received by the base station, the base station will relay the request via communication line 40 to wireless network controller 38. Confirmation that wireless telephone 16 is an authorized user is begun by the WNC 38 transmitting an access request message that includes the identification number of the requesting wireless telephone 16 to wireless control database 58 over channel 60. In response, the wireless control database 58 checks its data, locates the identification number of wireless telephone 16, and transmits a reply message consisting of the record associated with the identification number to the wireless network controller 38. Database 58 also transmits other data relevant to the requesting user to the wireless network controller such as that telephone wire pair 48 should be used to support the requested communications since the subscriber is also supported by wire telephone 32, which is serviced by one of the telephone wire pairs 48. In response to the information received from database 58, the wireless network controller 38 makes the decision of whether access will be granted. If access is granted, the WNC 38 provides a command signal via communication line 40 to base station 28 which instructs the base station to open an available communication channel with the wireless telephone 16 utilizing the interface circuit 90 coupled to the telephone wire pair 48.

Referring to FIGS. 3 and 4, one of the multiplex channels carded by line 40 will be assigned for voice communications in response to the request. The voice channel assigned to wireless telephone 16 is coupled by one of lines 88 to switch 86 which, under the control of microprocessor unit 76, is connected to a corresponding voice channel via one of lines 92 to the interface circuit 90 which supports the telephone line pair 48. The constant current source 110 of the corresponding interface circuit is activated thereby establishing DC current flow over lines $T_{co}$, $R_{co}$ and connected line 54. This current flow is interpreted by the central office telecommunication switch 56 as a request for service. In response, the switch provides conventional dial tone, which is transmitted via the associated interface circuit 90 to the wireless telephone 16. The user then enters the number to be called, such as by utilizing a conventional Touch-tone pad associated with wireless telephone 16. The current detector/bridge lifter circuit 100 for the corresponding interface circuit, having detected no current flow through the $T_{SUB}$ and $R_{SUB}$ lines since the associated wire telephone 32 is on-hook, will present a high impedance to the connected line $T_{co}$, $R_{co}$ coupled to the central office. At the conclusion of the call, the user causes the wireless telephone 16 to initiate an on-hook or end of communication transmission, which will cause the established communication path to be released.

Another aspect of the present invention addresses the transfer of in-progress calls between wired and wireless telephones. Assume that the physical location of wire telephone 32 is within the range of base station 28, that communications have been established via wireless telephone 16 between a subscriber and another party through central office 42, and that this subscriber subscribes for both wireless telephone 16 and wire telephone 32. The subscriber using wireless telephone 16 within the customer premises 10 walks toward the associated wire telephone 32 which may be located in the subscriber's office. Upon the subscriber reaching his office, the subscriber desires to continue the current conversation, but would prefer continuing the conversation utilizing wire telephone 32. The subscriber picks up the receiver of wire telephone 32 thereby providing a low DC impedance on the $T_{SUB}$, $R_{SUB}$ lines of the connected interface circuit 90 indicative of a request for service. Since the wire telephone 32 is connected via the main distribution frame 50 and the wire pair 48 to the interface circuit 90 that also supports the current communication path with wireless telephone 16, the current detector/bridge lifter circuit 100 of the interface circuit detects the low impedance on the $T_{SUB}$, $R_{SUB}$ lines. As a result, circuit 100 connects line $T_{SUB}$, $R_{SUB}$ to the line $T_{co}$, $R_{co}$ which is connected to the central office switch 56.

At this time, both the wireless telephone 16 and the wire telephone 32 will be coupled to the central office switch line 54 associated with the subject subscriber. Although both the wired and wireless telephones could both be used to have a two-party conference with the party connected via the CO, assume that the subscriber then causes the wireless telephone 16 to initiate an on-hook, or end of communication signal thereby causing the wireless communication path up to the interface circuit to be dropped. In the interface circuit, the constant current source 110, which was previously active or drawing current, is inhibited under the control of the microprocessor 126. The SLAC 118 receives a signal from the microprocessor 126 causing it to change from a low to a high impedance. Relay contact 108 also opens upon the wireless telephone going on hook to cause a high impedance to be reflected to the Tco/Rco lines. However, the communication path from the interface circuit to the central office switch line is maintained in view of the current flow provided through current detector/bridge lifter 100 and the conventional wire telephone 32. Thus, the subscriber continues the conversation initiated with the wireless telephone using his wire telephone 32 without: (a) loss of connection with the other party: (b) requiring a new call origination; (c) requiring any additional actions by the telecommunication switch 56. It will be apparent to those skilled in the art that it may be desired to provide the switch 56 with an indication of this transfer such as for billing purposes; however, no action, by switch 56 is needed to effectuate the actual transfer of communications between wireless and wired telephones.

Where a subscriber desires both a wireless and wire telephone associated with the same directory number and central office port, an incoming call causes the wire telephone to ring and will also cause a wireless communication path to be made to the wireless telephone which will also ring. The subscriber will then have the option of answering the wire, wireless, or both telephones and, as explained above, can transfer between the wireless telephone and the wire telephone if later desired.

It will be apparent to those skilled in the art that various modifications can be made to the illustrative embodiment. For example, each tenant group could be served by a defined set of wireless communication channels instead of a defined set of base stations so that a base station capable of handling several channels could receive more than one tenant group.

Although an embodiment of the present invention has been described above and illustrated in the drawings, the scope of the invention is defined by the claims which follow.

We claim:

1. In a communication system administered by a service provider including wireless telephones, radio frequency base stations that provide wireless communication channels for the wireless telephones, and a switched telecommunication office that supports communication channels, the improvement comprising:

wireless network controller (WNC) means for interconnecting said communication channels supported by said switched telecommunications office and wireless communication channels, said WNC means receiving requests from said wireless telephones via said base stations for access to a service communication channel;

a single database means separate from and coupled to said WNC means for assigning each wireless telephone to one of a plurality of independent groups of tenants, said database means also determining whether a wireless telephone making said request for access to a service communication channel is a member of the group of tenants supported by said base station that received the request based on records controlled by the service provider and stored in the database means for each wireless telephone;

said WNC means, in response to said database means determining that a wireless telephone making a request for access to a service communication channel is a member of the group of tenants supported by said base station that received the request, interconnecting a communication channel from said telecommunications office with a wireless communication channel provided by the base station associated with the requesting wireless telephone, whereby the WNC means is capable of serving a plurality of groups of tenants and wireless telephone service is based on tenant group membership.

2. The system according to claim 1 wherein each request received by said database means includes a unit identification number that uniquely identifies each wireless telephone.

3. The system according to claim 2 wherein said WNC means comprises means for transmitting an access message including said unit identification number to said database means, and means for receiving a reply from said database means corresponding to said access message, said reply including information retrieved from the record associated with the wireless telephone requesting service in the database means associated with said unit identification number, said WNC means determining if access to said service channel will be granted based on said reply.

4. The system according to claim 1 wherein said database means associates each base station with only one group of tenants.

5. The system according to claim 1 wherein said database means assigns a wireless telephone to only one group of tenants upon an initial registration of a wireless telephone by storing information identifying the one group of tenants in each record associated with a wireless telephone, said assignment to only one group being effective for all subsequent communications by said wireless telephone.

6. A method for supporting wireless communications by independent groups of tenants in a communication system including wireless telephones, radio frequency base stations that provide wireless communication channels for the wireless telephones, and a switched telecommunication office that supports wired communication channels, the method comprising the steps of:

assigning each wireless telephone to only one of a plurality of groups of tenants during an initial registration of each wireless telephone said assigning step including the storing by a service provider of a record in a single database for each wireless telephone where the record contains information identifying the tenant group to which the wireless telephone is assigned, each tenant group being supported by a predetermined set of said base stations;

receiving requests from said wireless telephones via base stations for access to a service communication channel;

determining, based on said information contained in the record associated with requesting wireless telephone, whether a wireless telephone making said request is a member of the tenant group that is associated with the base station through which the request was made;

responsive to said determining step determining a requesting wireless telephone is a member of the tenant group associated with the base station through which the request was made, coupling a wired communication channel from said telecommunications office with a wireless communication channel supported by the base station associated with the requesting wireless telephone to provide a service communications channel from the wireless telephone to the telecommunications office, whereby access to wireless communications is based on tenant group membership.

7. The method according to claim 6 wherein each request includes a unit identification number that uniquely identifies each wireless telephone.

8. The method according to claim 7 wherein said determining step comprises the step of transmitting an access message including said unit identification number to a database that stores information associated with the assignment of wireless telephones to tenant groups and associated base stations, and receiving a reply from said database corresponding to said access message containing said stored tenant group information associated with said unit identification number of the requesting wireless telephone, said stored information used in said determination of whether a requesting wireless telephone is a member of the tenant group associated with the base station through which the request was made.

9. The method according to claim 6 wherein each base station is assigned to support service communications with only one group of tenants.

10. The method according to claim 6 wherein said assignment of each wireless telephone to only one of a plurality of groups of tenants during an initial registration remains effective for all subsequent communications by said wireless telephone.

11. A wireless communication arrangement administered by a service provider and adapted for supporting wireless telephones comprising:

wireless network controller (WNC) means for interconnecting wired communication channels provided by a switched telecommunication office and wireless communication channels supported by radio frequency base stations, said WNC means receiving requests from said wireless telephones via said base stations for access to a service communication channel;

a single database means separate from and coupled to said WNC means for assigning each wireless telephone to only one of a plurality of groups of tenants, said database means also determining whether a wireless telephone making said request for access to a service communication channel is a member of the group of tenants supported by said base station that received the request based on records controlled by the service provider and stored in the database means for each wireless telephone;

said WNC means, in responsive to said database means determining that a wireless telephone making a request for access to a service communication channel is a member of the group of tenants supported by said base station that received the request, interconnecting a wired communication channel from said telecommunications office with a wireless communication channel provided by the base station associated with the requesting wireless telephone, whereby the wireless communication arrangement is capable of serving a plurality of groups of tenants and wireless telephone service is based on tenant group membership.

12. The arrangement according to claim 11 wherein each request received by said database means includes a unit identification number that uniquely identifies each wireless telephone.

13. The arrangement according to claim 12 wherein said WNC means comprises means for transmitting an access message including said unit identification number to said database means, and means for receiving a reply from said database means corresponding to said access message, said reply including information retrieved from the record associated with the wireless telephone requesting service in the database means associated with said unit identification number, said WNC means determining if access to said service channel will be granted based on said reply.

14. The arrangement according to claim 11 wherein said database means associates each base station with only one group of tenants.

15. The arrangement according to claim 11 wherein said database means assigns a wireless telephone to only one group of tenants upon an initial registration of a wireless telephone by storing information identifying the one group of tenants in each record associated with a wireless telephone, said assignment to only one group being effective for all subsequent communications by said wireless telephone.

* * * * *